Patented June 19, 1945

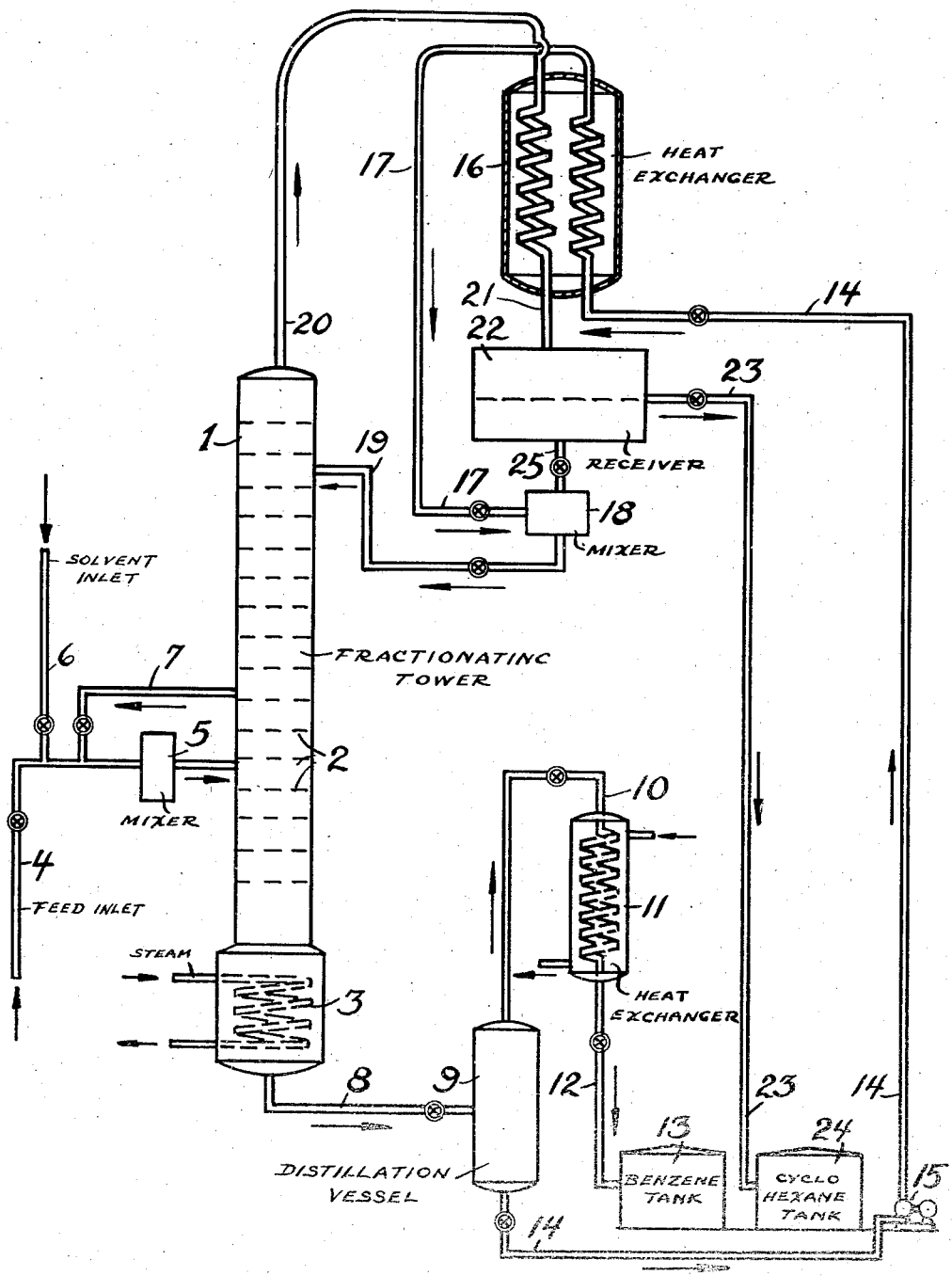

2,378,808

UNITED STATES PATENT OFFICE 2,378,808

SEPARATION OF HYDROCARBONS

William J. Sweeney, Summit, N. J., assignor to Standard Oil Development Company, a corporation of Delaware Application October 4, 1941, Serial No. 413,615

3 Claims. (Cl. 260—674)

This invention relates to the separation of a mixture of hydrocarbons into its constituent components and is more particularly concerned with the separation into its components of a mixture of naphthenic and aromatic hydrocarbons which have vapor pressures under normal conditions of distillation which are coincident or very close together and which therefore cannot be separated by ordinary distillation methods.

It is a principal object of the present invention to provide a method for effecting a separation between naphthenic and aromatic hydrocarbons of the type described in a single operation. The method by which this is done consists essentially of a simultaneous solvent extraction and distillation and will be fully understood from the following description when read with reference to the accompanying drawing which is a semi-diagrammatic view in sectional elevation of one type of apparatus suitable for the purpose.

Referring to the drawing, numeral 1 designates a conventional type of fractionating tower provided with bubble-cap plates 2 and a heating means 3. The hydrocarbon mixture to be separated, which for purposes of description may be a mixture of cyclohexane and benzene, is introduced into the tower through a line 4 and mixing device 5. At the start of the process, a solvent which is selective for one of the components of the hydrocarbon mixture is introduced into line 4 through line 6. Suitable solvents which are selective for the benzene in this case are phenol, cresylic acid, aniline, nitrobenzene, furfural and the like, to mention only a few. Phenol is a particularly suitable solvent. After the system is in equilibrium, a stream of hydrocarbon-solvent mixture is withdrawn from the tower through a line 7 at a point above that at which the feed is introduced thereinto, and is admixed with the feed in mixing device 5. Fresh solvent is introduced periodically in amounts equivalent to losses which may occur from the system.

An extract consisting essentially of benzene and solvent is removed from the bottom of the tower through a line 8 and introduced into a distillation means 9. The benzene is vaporized and passes off through line 10 into a condensing means 11. The condensed benzene is removed through line 12 and collected in a tank 13. The solvent is removed from the distillation means 9 through line 14 and is forced by means of pump 15 through a heat exchange means 16 and thence through line 17, mixing device 18 and line 19 into the upper portion of the tower 1.

Vapors which will consist essentially of cyclohexane are removed from tower 1 through line 20, passed through heat exchange means 16 wherein they are cooled and condensed by interchange of heat with the cold, entering solvent. The condensate passes through line 21 into a receiver 22 from which cyclohexane is withdrawn through line 23 and collected in a tank 24. A portion of the cyclohexane collected in receiver 22 is passed through line 25 into mixing device 18 wherein it is admixed with solvent and the mixture then introduced into tower 1 at a point one or two plates below the top to eliminate entrainment of solvent.

Although the above description has been made with particular reference to the separation of a mixture of cyclohexane and benzene, it will be understood that the method is equally applicable to the separation of other mixtures of naphthenic and aromatic hydrocarbons which have vapor pressures so close to each other as to make separation by ordinary distillation difficult, if not impossible. As examples of such other mixtures of naphthenic and aromatic hydrocarbons may be mentioned mixtures of methyl cyclohexane and toluene and mixtures of dimethyl cyclohexanes and xylenes.

In the operation of the process the temperature maintained in the tower should be high enough to cause complete vaporization of the hydrocarbons not in solution but should not be so high as to cause appreciable vaporization of the solvent. The exact temperature used in any particular case will of course depend upon the boiling points of the components of the hydrocarbon mixture and the solvent which is used. The quantity of liquid solvent which is caused to flow in countercurrent to the vapors of hydrocarbons should be at least sufficient to dissolve all of the hydrocarbon component for which it is selective and which may be present in the mixture. In most cases it is preferable to use from 1 to 10 volumes of solvent for each volume of liquid hydrocarbon mixture.

The quantity of reflux which is put back into the top of the tower will depend primarily upon the degree of separation that is desired. If a high degree of separation is to be effected, the reflux ratio may be as much as 25:1, that is 25 volumes of reflux will be put back into the tower for each volume which comes overhead. On the other hand, if only a rough separation is required, the reflux ratio may be as low as 5:1 or even 1:1.

The following experiments illustrate the effectiveness of the present method in making a separation between cyclohexane and benzene:

A 50:50 mixture of cyclohexane and benzene is placed in a still having a 30 inch fractionating column. In the first experiment, the mixture is distilled in the absence of any solvent. In the second experiment the mixture is distilled against a countercurrent flow of liquid phenol. In each case 5% cuts are taken overhead and analyzed for their benzene content. The following table shows the results obtained:

| Cut No. 5% | Percent benzene in cut | |
|---|---|---|
| | No solvent | Phenol |
| 1 | 49 | 30 |
| 2 | 49 | 31 |
| 3 | 49 | 36½ |
| 4 | 49 | 35 |
| 5 | 49½ | 36¼ |
| 6 | 49¼ | 34 |
| 7 | 48½ | 34¾ |
| 8 | 49¾ | 35 |
| 9 | 49 | 36 |
| 10 | 49¾ | 40¼ |
| 11 | 49¾ | 40¾ |
| 12 | 49¾ | 38 |
| 13 | 49¾ | 40¼ |
| 14 | 49¾ | 42 |
| 15 | 50½ | 51¼ |
| 16 | 49¾ | 63½ |
| 17 | 49¾ | 90¾ |
| 18 | 50½ | 98½ |

The above results clearly indicate how the presence of the phenol reduces the vapor pressure of the benzene and thus makes it possible to separate it from the cyclohexane.

This invention is not limited by any theories of the mechanism of the reactions nor by any details which have been given merely for purposes of illustration but is limited only in and by the following claims.

I claim:

1. A continuous process for separating into its components a mixture of naphthenic and aromatic hydrocarbons having substantially the same vapor pressures which comprises introducing the mixture into the middle portion of a fractionating tower maintained at a temperature above the vaporization temperature of the hydrocarbons, introducing into the upper portion of the tower, a solvent which is selective for one of the components of the hydrocarbon mixture and which remains in liquid phase at the vaporizing temperature of the hydrocarbons, withdrawing from the tower a stream composed of hydrocarbons and solvent, at a point above that at which the feed is introduced and spaced from the top of the tower, and admixing said withdrawn stream with the feed in a mixing zone for passage with the feed into the middle portion of the tower removing an extract phase comprising the solvent and the component of the hydrocarbon mixture for which it is selective from the bottom of the tower, recovering one of the components of said hydrocarbon mixture from the extract phase, removing from the upper portion of the tower vapors of the other hydrocarbon component of the mixture and condensing the same.

2. Process for separating a mixture of cyclohexane and benzene into its component parts which comprises introducing the mixture into the middle portion of a fractionating tower, maintaining the tower at a temperature sufficient to vaporize the mixture, introducing a selective solvent for benzene which has a boiling point substantially above the vaporizing temperature of cyclohexane and benzene into the upper portion of the tower and causing said selective solvent to flow countercurrent to the vaporized hydrocarbons, withdrawing from the tower a stream composed of hydrocarbons and solvent, at a point above that at which the feed is introduced and spaced from the top of the tower, and admixing said withdrawn stream with the feed in a mixing zone for passage with the feed into the middle portion of the tower removing an extract phase comprising benzene and selective solvent from the bottom of the tower, separating the benzene from the solvent, removing vapors of cyclohexane from the upper portion of the tower and condensing the same.

3. Process according to claim 2 in which the selective solvent is phenol.

WILLIAM J. SWEENEY.